United States Patent Office 3,382,069

Patented May 7, 1968

3,382,069

PLANOGRAPHIC PRINTING PLATE

Henning H. Borchers, Mountainside, and Thomas N. Gillich, North Plainfield, N.J., assignors to Azoplate Corporation, Murray Hill, N.J., a corporation of New Jersey No Drawing. Filed June 18, 1964, Ser. No. 376,270
9 Claims. (Cl. 96—33)

ABSTRACT OF THE DISCLOSURE

This invention relates to a novel planographic printing plate, and process for developing such a plate, the plate comprising an aluminum base material pretreated with an alkali-metal silicate and having a light-sensitive coating thereon, the latter comprising a mixture of a water-insoluble organophilic resin and a water-soluble diazonium salt of a para-aminodiphenylamine.

The planographic printing plate of the present invention is superior to plates heretofore known in that by a single coating operation an aluminum base or carrier can be coated with a light-sensitive layer of controlled moisture sensitivity. As a result, a planographic printing plate is obtained which, after exposure to light under a master, can be developed with water or with mixtures of water or water-miscible organic solvents and yet is sufficiently insensitive to moisture that it can be handled without damage to the light-sensitive surface.

The aluminum base or carrier is pretreated before the application of the light-sensitive layer thereto with an alkali metal silicate, which treatment may be effected in accordance with the teachings of U.S. Patent No. 2,732,796, or in accordance with U.S. Patent No. 2,507,314, using first a solution containing alkali metal fluoride and a final treatment with a solution of sodium silicate.

The light-sensitive layer supported on such a pretreated aluminum base comprises one or more water-insoluble organophilic resins in admixture with a water-soluble additive. The additive does not undergo a chemical reaction with the resins to render the light-sensitive layer water-soluble but it is believed that the physical mixture of an organophilic resin or resins with a water-soluble additive results in the desired effect. Although not proven, it is assumed that the light-sensitive layer comprising one or more organophilic resins and containing the water-soluble additive becomes removable with water or with mixtures of water and polar organic solvents because the water dissolves the additive and thereby destroys the continuity of the resinous film. Thus, on development, the film is not actually dissolved but is broken up and flushed away. Since the organophilic resins are insoluble in water, it is necessary to use an additive which is soluble both in water and in organic solvents while using a resin which is also soluble in the same organic solvents but insoluble in water.

By adjusting the ratio of organophilic resin or resins to additive, any desired degree of sensitivity to moisture can be obtained. By increasing the quantity of additive, water development of the exposed plate can be made instantaneous on contact or, by reducing the quantity of additive, the ease and speed of development with water can be reduced to a point such that development is effected only after prolonged treatment or even requires mixtures of water with polar organic solvents.

The preferred method of applying the reproduction coating containing a resin to the pretreated aluminum base material is by forming a solution of the resin or resins and the light-sensitive substance in an organic solvent, although it is possible to form the layer by using an emulsion coating procedure. Where organic solvent solutions are employed, the solution is applied to the pretreated aluminum base material using a plate whirler, for example, after which the solvent is volatilized, leaving a thin uniform coating on the pretreated aluminum base. Where emulsion coating procedures are employed, a solution of the organophilic resin or resins in an organic solvent is dispersed in an aqueous medium by any known method of emulsification, as a result of which the dispersing aqueous phase of the emulsion contains the water-soluble diazo sensitizer and any other additive which might be added, and the dispersed phase contains the organophilic resin or resins. Such emulsion coatings, however, do not exhibit the desired degree of uniformity since the resin in the dispersed phase and the ingredients in the aqueous dispersing phase are physically separated and, thus, intimate mixture thereof is never attained. The additive necessary for the water development of thin films of organophilic resins may be the light-sensitive diazo compound itself, provided the latter is readily soluble in water. If desired, other additives may be employed for adjusting the ease of development of the light-sensitive layers, such as phosphoric acid for example.

Suitable resins are those which have one or more groups conferring alkali-solubility such as an acid anhydride, a carboxylic acid, a sulfonic acid, a sulfonamide, a sulfonimide, or an acetal, such as a formal or a butyral group and are, for example, vinyl polymers, vinyl interpolymers, phthalic acid ester resins, maleinate resins, alkyd resins, colophony resins or polyacrylic acid resins. Resins of the novolak type are also suitable.

The ratio of organophilic resin or resins to the light-sensitive substance may be in the range of about 100:1 to 1:4 by weight, preferably 50:1 to 1:1 by weight. Where the light-sensitive substance acts as the additive, it may be used alone or in admixture with another additive such as phosphoric acid. In the latter case, the weight ratio of diazo compound to phosphoric acid may be in the range of about 5:1 to 1:2, preferably about 1:1 by weight.

In coating solutions using organic solvents, the solids concentration of the solution may be in the range of about 0.04 to 15 percent by weight, preferably 0.25 to 9 percent by weight. Depending upon the resin or resins used, the coating weight deposited on the plate may vary from about 30 mg. per square yard to about 3000 mg. per square yard with the preferred range being between 100 mg. to about 1700 mg. per square yard for coatings employing a single resin or, if more than one resin is used, the coating weight deposited can successfully be increased with the preferred range being between 300 mg. to 2500 mg. per square yard. Heavier coatings are possible with mixed resins since better coating characteristics can be obtained by selecting the resin partners to obtain better solvent release, better flowing properties, and the like. Where emulsion coatings are used, the solids concentration of the emulsion is adjusted, depending upon the coating method used, to yield a final coating weight deposited on the plate in the same range as that for solution coating.

The water-soluble light-sensitive diazo compounds which may be used as sensitizers may be water-soluble diazonium salts of a paraamino diphenylamine in the form of a monomer or a condensation product with formaldehyde or other aldehyde or ketone. For example, such condensation products may be employed as sensitizers as are described in copending applications Ser. No. 150,211, filed Nov. 6, 1961; Ser. No. 207,800, filed July 18, 1961; Ser. No. 124,791, filed July 18, 1961; Ser. No. 124,786, filed July 18, 1961; Ser. No. 124,777, filed July 18, 1961; Ser. No. 167,910, filed Jan. 22, 1962; and Ser. No.

183,725, filed Mar. 30, 1962. Those condensation products of a diazonium salt of a para-amino diphenylamine with formaldehyde, either condensed in phosphoric acid or to which phosphoric acid is added after condensation, have been found to be most efficacious in the present invention since these sensitizers readily dissolve in organic solvents, such as glycol ethers, which solvents are also suitable solvents for many organophilic resins which may be used in the present invention.

The invention will be further illustrated by reference to the following specific examples in which all precentages are by weight unless otherwise stated:

Example 1

A solution, in ethylene glycol monomethyl ether, of equal parts by weight of a condensate of para-diazo-diphenylamine chloride and formaldehyde, condensed in phosphoric acid in accordance with the procedure of copending application Ser. No. 150,211, filed Nov. 6, 1961; and Lytron 820 (A styrene copolymer containing carboxyl groups manufactured by Monsanto Chemical Co., having specific gravity: 1.14–1.16; free styrene: 1 percent maximum; acid number: 180–190; equivalent weight: 295–310; and decomposition temperature: 210° C.) was coated onto an aluminum carrier the surface of which was pretreated in accordance with the procedure of U.S. Patent No. 2,507,314. The coating was then dried at a temperature of 80° C. for one minute after which the plate was exposed to light under a negative master. The areas not struck by light then were removed from the base material by washing the exposed layer with water. Without further treatment, the now imaged printing plate was clamped into an offset printing press and a number of well defined prints were produced.

Example 2

A solution, in ethylene glycol monomethyl ether, of 1 part by weight of Butvar B–76 (a polyvinyl butyral resin manufactured by Shawinigan Resins having an average molecular weight of 50,000; hydroxyl content (as percent polyvinyl alcohol) minimum 9, maximum 13; acetate content (as percent polyvinyl acetate) maximum 2.5; butyral content (as percent polyvinyl butyral) about 88 percent; specific gravity: 1.1; viscosity about 175 centipoises, as determined by Ostwald viscosimeter (10 percent in 95 percent ethyl alcohol at 25° C.)) and 1 part by weight of a condensation product of para-diazo-diphenylamine chloride and formaldehyde, condensed in hydrochloric acid in accordance with the procedure of copending application Ser. No. 207,800, filed July 5, 1962; was applied to an aluminum sheet, the surface of which had been pretreated according to the procedure of U.S. Patent No. 2,507,314. The coating was dried for 1 minute at 80° C., exposed to light under a negative master and developed with water. The plate was then run on a press to make a number of flawless copies.

Example 3

A solution, in ethylene glycol monomethyl ether, of equal parts by weight of para-diazo-diphenylamine monomer and Formvar 12/85 (a polyvinyl formal manufactured by Shawinigan Resins, having a molecular weight of 30,000; hydroxyl content (as percent polyvinyl alcohol) 5 to 7; acetate content (as percent polyvinyl acetate) 20 to 27; specific gravity: 1.2; viscosity, in centipoises (determined with 5 grams of resin made to 100 ml. of ethylene chloride at 20° C.): 18 to 22), the solution having a total solids content of 1 percent by weight was applied to an aluminum carrier, the surface of which had been pretreated according to the procedure of U.S. Patent No. 2,732,796, after which the coating was dried at 80° C. for one minute. The planographic plate was then exposed to light under a negative master and developed with water. Multiple flawless copies were obtained when the plate was run on a printing press.

Example 4

A solution, in ethylene glycol monomethyl ether, of 1.25 parts by weight of a novolak resin marketed under the trade name Alnovol 429 K, by Chemische Werke Albert of Wiesbaden-Biebrich, Germany, and 2 parts by weight of a condensation product of para-diazo-diphenylamine chloride and formaldehyde, condensed in phosphoric acid in accordance with the procedure of copending application Ser. No. 150,211, filed Nov. 6, 1961 ,was applied to an aluminum carrier, the surface of which was pretreated in accordance with the procedure of U.S. Patent No. 2,732,796, after which the coating was dried. The thus formed presensitized plate was exposed to ultraviolet light for several minutes under a negative master and the light-exposed plate was then developed with water. A series of flawless copies was obtained when the plate was run on a printing press.

It will be obvious to those skilled in the art that many modifications may be made within the scope of the present invention without departing from the spirit thereof, and the invention includes all such modifications.

What is claimed is:

1. A process for developing a printing plate which comprises exposing a light-sensitive layer, supported on an aluminum base material pretreated with an alkali metal silicate, to light under a master and developing the resulting image with water, only whereby the non-light struck areas of the layer are removed the light-sensitive layer comprising a mixture of a water-insoluble, alkali-soluble organophilic resin and a water-soluble diazonium salt of a p-amino diphenylamine.

2. A process according to claim 1 in which the resin is a styrene copolymer containing carboxyl groups.

3. A process according to claim 1 in which the resin is polyvinyl formal.

4. A process according to claim 1 in which the resin is polyvinyl butyral.

5. A process according to claim 1 in which the resin is a novolak.

6. A process according to claim 1 in which the coating contains phosphoric acid.

7. A process according to claim 1 in which the diazonium salt is a condensation production of p-amino diphenylamine with formaldehyde.

8. A process according to claim 1 in which the diazonium salt is a condensation product of a p-amino diphenylamine with formaldehyde, condensed in phosphoric acid.

9. A process according to claim 1 in which the diazonium salt is a condensation product of a p-amino diphenylamine with formaldehyde to which excess phosphoric acid is added.

References Cited

UNITED STATES PATENTS

| | | | |
|---|---|---|---|
| 2,714,066 | 7/1955 | Jewett et al. | 96—75 |
| 3,136,637 | 6/1964 | Larson | 96—75 |
| 3,219,447 | 11/1965 | Neugebauer et al. | 96—75 X |

NORMAN G. TORCHIN, *Primary Examiner.*

ROLAND E. MARTIN, *Assistant Examiner.*